United States Patent
Von Tobel

[15] 3,668,218

[45] June 6, 1972

[54] COPPER PHTHALOCYANINESULPHONIC ACIDS

[72] Inventor: Hans Von Tobel, Riehen Basel-land, Switzerland

[73] Assignee: Sandoz Ltd., Basle, Switzerland

[22] Filed: Mar. 6, 1970

[21] Appl. No.: 17,297

[30] Foreign Application Priority Data

Mar. 25, 1969 Switzerland ...........................4469/69

[52] U.S. Cl. .................................260/314.5, 8/1 XA, 8/12, 8/54, 8/54.2, 8/57, 8/178 R, 8/178 E, 106/288 Q, 260/37 P
[51] Int. Cl. ..........................................................C07d 27/74
[58] Field of Search................................................260/314.5

[56] References Cited

UNITED STATES PATENTS 2,359,737  10/1944  Lacey et al. .........................260/314.5
2,365,464  12/1948  Gross................................260/314.5

FOREIGN PATENTS OR APPLICATIONS 267,711  1/1969  Austria..............................260/314.5

OTHER PUBLICATIONS

Min'kov et al., Chem. Abstracts 67:107899 k (1967).
Erlenmeyer et al., Chem. Abstracts 69:110468 r (1968).

Primary Examiner—Henry B. Jiles
Assistant Examiner—G. Thomas Todd
Attorney—Littlepage, Quaintance, Wray & Aisenberg

[57] ABSTRACT

Copper phthalocyaninesulphonic acids which contain on the average 2 to 3 sulphonic acid groups, of which 1 to 1.8 are in 4-positions and the remainder in 3-positions, are suitable for exhaustion dyeing, pad dyeing and printing of natural and synthetic polyamide fibers, polyurethane fibers, natural and regenerated cellulosic fibers and leather.

6 Claims, No Drawings

COPPER PHTHALOCYANINESULPHONIC ACIDS

This invention relates to copper phthalocyaninesulphonic acids which contain on the average 2 to 3 sulphonic acid groups, of which 1 to 1.8 are in the 4-positions and the remainder in the 3-positions. The compounds conforming to this invention contain preferably 2.2 to 2.6 or, more specifically, 2.4 or 2.5 sulphonic acid groups.

The said copper phthalocyaninesulphonic acids can be produced by treating with sulphur trioxide or an agent donating sulphur trioxide copper phthalocyaninesulphonic acids bearing on the average 1 to 1.8 sulphonic acid groups in the 4-positions, until the product of the sulphonation process, which takes effect in the 3-positions only, contains the desired number of sulphonic acid groups.

Alternatively, the process can start from copper phthalocyaninesulphonic acids which bear the sulphonic acid groups in the 3- and 4-positions, on condition that these compounds contain statistically at least 1 and not more than 1.8 sulphonic acid groups in the 4-positions and contain in all less than the desired number of sulphonic acid groups.

It is preferable to start from copper phthalocyaninesulphonic acids which are either sulphonated in the 4-positions alone or which bear 25 percent of the sulphonic acid groups in the 3-positions and 75 percent in the 4-positions. The copper phthalocyaninesulphonic acids of this invention can also be obtained by reacting the anhydrides of 4-sulphophthalic, 3-sulphophthalic and phthalic acid with an amide of carbonic acid and a copper donor in the presence of a catalyst.

Oleum and chlorosulphonic acid are the most widely suitable sulphonating agents. Oleum can be employed in any desired concentration from 5 percent strength to practically 100 percent sulphur trioxide, though it is preferable to effect sulphonation with 10 to 35 percent oleum. The temperature may be maintained at any value between room temperature and 120–130° C.: it is, however advisable to work at lower temperatures with highly concentrated oleum and at higher temperatures with the weak product. The reaction time is 5 to 24 hours in relation to the reaction conditions. The optimum reaction time is about 12 hours. If mild conditions are employed the time may have to be extended. Given more rigorous conditions the reaction time is shorter, but the yield is lower.

If chlorosulphonic acid is employed a temperature range of 90° to 120° C. is preferable. Here again the time required for the reaction is in inverse ratio to the temperature, the optimum reaction time being in the region of 12 hours.

The copper phthalocyaninesulphonic acids bearing the sulphonic acid groups in the 3- and 4-positions, which are to be further sulphonated by the present process, can be produced by reacting a mixture of 4-sulphophthalic anhydride and 3-sulphophthalic anhydride (preferably 75 percent of the 4-sulpho and 25 percent of the 3-sulpho derivative) with phthalic anhydride, an amide of carbonic acid and an agent donating copper in the presence of a catalyst, e.g., ammonium molybdate or titanium tetrachloride, and a solvent with a boiling point above 150° C, preferably nitrobenzene or trichlorobenzene. The molecular ratio of the 4-sulphophthalic anhydride to the total phthalic anhydrides employed is 1:4 to 1.8:4, while the molecular ratio of the mixture of 3- and 4-sulphophthalic anhydrides to the total phthalic anhydrides present may be up to 3:4. Examples of suitable amides of carbonic acid are urea, thiourea and guanidine. Suitable copper donors include pulverized metallic copper and copper salts, such as copper (I) chloride, copper (II) chloride, copper sulphate and copper acetate. The reaction is carried out at temperatures in the range of 150° to 250° C. or, preferably, at 170°–200° C. and takes from 2 to 24 hours depending on the conditions. The dye formed can be isolated by distilling off the solvent and adding hydrochloric acid and sodium chloride for precipitation, followed by filtration of the precipitate, washing with sodium chloride solution and drying. If necessary, the dye produced, as given in the foregoing, may be sulphonated further until it contains the desired number of sulphonic acid groups.

The dyes obtained as described above are suitable the exhaustion dyeing, pad dyeing and printing of natural and synthetic polyamide fibers, polyurethane fibers, natural and regenerated cellulosic fibers and leather.

In relation to the nearest comparable copper phthalocyanines, which are sulphonated in the 4-positions only, the copper phthalocyanine dyes disclosed herein have higher solubility in water and greater affinity for synthetic polyamide fibers. Compared with the nearest comparable copper phthalocyanines sulphonated in the 3-positions only, the copper phthalocyanine dyes of this invention have better light fastness on synthetic polyamide fibers.

In the following Examples the parts and percentages are by weight and the temperatures are expressed in degrees centigrade.

EXAMPLE 1

A copper phthalocyaninesulphonic acid containing on the average 1.7 sulphonic acid groups in the 4-positions is prepared by co-condensation of 1.7 moles of 4-sulphophthalic anhydride and 2.3 moles of phthalic anhydride or phthalodinitrile, either in a urea melt or with urea in an organic solvent, using the normal methods. 50 parts of the acid are entered into 500 parts of oleum with an $SO_3$ content of 26 percent and reacted at 50° with stirring until a sample, after precipitation in water and neutralization, is found to be readily soluble in water. The sulphonation mixture is then run into 2,000 parts of ice-water. The precipitated dye is filtered off with suction and pasted with sodium hydroxide solution until a pH value of 9 is reached, on which the paste is dried at 100°. Analysis of the final dye shows that it contains an average of 2.4 sulphonic acid groups.

EXAMPLE 2

50 Parts of copper phthalocyaninesulphonic acid bearing on the average 1.0 sulphonic acid group in the 4-position are stirred into 300 parts of chlorosulphonic acid. The resulting suspension is raised to 107°–110° and stirred for 5 hours at this temperature. When, after this time, a sample is added to dilute sodium carbonate solution with heating, a clear solution is formed. The reaction mixture is unloaded with stirring into a mixture of 1,500 parts of ice and 500 parts of water. The precipitate is filtered off, the filter cake washed with 1 percent hydrochloric acid, pasted with hot water and the paste adjusted to pH 9 with hot sodium hydroxide solution, after which it is dried at 100°. On analysis the resulting dye is found to contain an average of 2.9 sulphonic acid groups.

EXAMPLE OF APPLICATION

Two parts of the dye produced as given in Example 2 are dissolved in 6,000 parts of distilled water, and 2 parts of 100 percent acetic acid are added to the thus obtained solution. 100 parts of yarn of nylon 66 polyamide fiber, after previous wetting out, are entered into this dyebath. The bath is raised to the boil in 30 minutes and held at the boil for 1 hour, after which the yarn is rinsed and dried. A level and brilliant turquoise dyeing of good light fastness is obtained.

EXAMPLE 3

32.7 Parts of a mixture of about 75 percent of 4-sulphophthalic anhydride and about 25% of 3-sulphophthalic anhydride (prepared by sulphonation of phthalic anhydride with sulphur trioxide by the known method), 39.4 parts of phthalic anhydride, 250 parts of urea, 12 parts of copper (I) chloride and 12 parts of titanium tetrachloride are entered into 500 parts of nitrobenzene with stirring. In the course of 3–4 hours the reaction mixture is raised to 185° with continued stirring and held at this temperature for 2 hours, after which it is allowed to cool to 100°. Water vapor is directed into it to distill off the nitrobenzene. Then sodium chloride and hydrochloric acid are added, causing complete precipitation of the dye formed, the latter being filtered off with suction, washed with 5 percent sodium chloride solution and dried at 100°. A not completely water-soluble product is obtained. The product contains sodium chloride and 65 parts of a copper phthalocyaninesulphonic acid of 6.1 percent sulphur content, which is equivalent to an average content of 1.3 sulphonic acid groups, of which 1.0 is in the 4-position. The dry powder dye is entered into 350 parts of oleum of 25 percent sulphur trioxide content and stirred at 50°–60° until such time as a sample dissolves completely in water of neutral reaction. At this point the sulphonation mixture is run into a mixture of 700 parts of water, 300 parts of ice and 50 parts of sodium chloride with stirring. The dye settles out and is filtered off with suction, washed with sodium chloride solution and dried. This dye contains salt and approximately 75 parts of a copper phthalocyaninesulphonic acid with a sulphur content of 10 percent, which is equivalent to an average content of 2.4 sulphonic acid groups.

EXAMPLE 4

59 Parts of a mixture of about 75 percent of 4-sulphophthalic anhydride and about 25 percent of 3-sulphophthalic anhydride and 23 parts of phthalic anhydride are condensed by the method of Example 3. The reaction product contains salt and about 75 parts of a copper phthalocyaninesulphonic acid with a sulphur content of 10 percent, which is equivalent to an average content of 2.4 sulphonic acid groups, of which 1.8 are in 4-positions.

This dye is fully soluble in water and can be used for dyeing as obtained. If higher solubility and lower salt sensitivity are desired, the content of sulphonic acid groups can be increased to 3 by treatment for 5 hours at 50°–55° in oleum of 35 percent sulphur trioxide content. The dye is isolated as given in Example 3.

Having thus disclosed the invention what I claim is:

1. Copper phthalocyaninesulphonic acids which contain an average of from 2 to 3 sulphonic acid groups, of which 1 to 1.8 are in 4-positions and the remainder in 3-positions.

2. Copper phthalocyaninesulphonic acids according to claim 1, which contain an average of from 2.4 to 2.5 sulphonic acid groups.

3. Copper phthalocyanine sulphonic acids according to claim 1 which contain an average of 2.4 sulphonic acid groups of which 1.7 are in 4-positions.

4. Copper phthalocyanine sulphonic acids according to claim 1 which contain an average of 2.8 sulphonic acid groups of which 1.0 is in 4-position.

5. Copper phthalocyanine sulphonic acids according to claim 1 which contain an average of 2.4 sulphonic acid groups of which 1.0 is in 4-position.

6. Copper phthalocyanine sulphonic acids according to claim 1 which contain an average of 2.4 sulphonic acid groups of which 1.8 are in 4-positions.

* * * * *